United States Patent
Chu et al.

(10) Patent No.: US 7,331,047 B2
(45) Date of Patent: Feb. 12, 2008

(54) DETERMINISTIC SYSTEM AND METHOD FOR IMPLEMENTING SOFTWARE DISTRIBUTED BETWEEN A DESKTOP AND A REMOTE DEVICE

(75) Inventors: George Chu, Mercer Island, WA (US); Timothy Y. Ng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/721,396

(22) Filed: Nov. 25, 2003

(65) Prior Publication Data

US 2005/0114644 A1    May 26, 2005

(51) Int. Cl.
*G06F 9/445* (2006.01)

(52) U.S. Cl. .................. 717/178; 717/173

(58) Field of Classification Search ........ 707/202; 709/203; 717/168–178
See application file for complete search history.

(56) References Cited

U.S. PATENT DOCUMENTS

| | | | | |
|---|---|---|---|---|
| 5,991,771 | A * | 11/1999 | Falls et al. ........... | 707/202 |
| 6,279,030 | B1 * | 8/2001 | Britton et al. ........ | 709/203 |
| 6,606,744 | B1 * | 8/2003 | Mikurak .............. | 717/174 |
| 6,968,550 | B2 * | 11/2005 | Branson et al. ...... | 717/168 |
| 7,032,003 | B1 * | 4/2006 | Shi et al. ............. | 709/203 |
| 7,127,713 | B2 * | 10/2006 | Davis et al. .......... | 717/177 |
| 7,200,530 | B2 * | 4/2007 | Brown et al. ........ | 703/1 |
| 7,213,047 | B2 * | 5/2007 | Yeager et al. ........ | 709/202 |
| 7,254,608 | B2 * | 8/2007 | Yeager et al. ........ | 709/203 |

OTHER PUBLICATIONS

Windows 98 Developer's Handbook, Ben Ezzell et al, pp. 328-340, 1998.*
Constantinou, A. et al., "An Architecture for a Distributed 3G Mobile Terminal", *Third International Conference on 3G Mobile Communication Technologies(IEE Conf. Publ. 489)*, 2002, 459-463.
Grimm, M. et al., "Towards a Framework for Mobile Knowledge Management", *Practical Aspects of Knowledge Management. 4th International Conference*, 2002, Proceedings (Lecture Notes in Artificial Intelligence), 2569, 326-38.
Starobinski, D. et al., "Efficient PDA Synchronization", *IEEE Transactions on Mobile Computing*, 2(1), 40-51, Jan.-Mar. 2003.

* cited by examiner

*Primary Examiner*—Todd Ingberg
(74) *Attorney, Agent, or Firm*—Woodcock Washburn LLP

(57) ABSTRACT

Software running on a desktop device determines whether or not binaries (executables) need to be pushed to a remote device. If binaries need to be pushed to the remote device, the desktop determines which particular binaries need to be pushed to the remote device, and pushes the needed binaries to the remote device. Once all needed binaries are loaded onto the remote device, functions on the remote device can be executed via remote procedure calls.

23 Claims, 7 Drawing Sheets

DETERMINISTIC SYSTEM AND METHOD FOR IMPLEMENTING SOFTWARE DISTRIBUTED BETWEEN A DESKTOP AND A REMOTE DEVICE

FIELD OF THE INVENTION

The invention relates to computing and in particular to a technique for executing code on a remote device.

BACKGROUND OF THE INVENTION

The use of computers has become ubiquitous in everyday living. Most computer users are connected to networks, and have access to data and devices on those networks. When a user leaves his desktop, he typically relies on remote devices such as personal digital assistants (PDAs), "smart" cellular telephones, and other handheld devices to stay connected. Over the past few years, there has been a prodigious leap in the popularity of smart, connected remote devices.

The operating system that runs on remote devices is often a pared-down version of a full-scale desktop operating system. For example, some remote devices run on a variation of the Microsoft Windows operating system called Microsoft® Windows® CE. Windows® CE is a Windows-compatible real-time operating system that fills the need for a small, scalable operating system that works in a broad selection of embedded and non-embedded products. Windows® CE is based on the Microsoft Windows® operating system but is designed to be included or embedded in many mobile and other space-constrained devices. Others mobile remote devices run on the EPOC® operating system or have their own or another operating system.

The software that runs on the remote device is typically not a full-scale operating system because of constraints inherent in the remote device. In consequence, many features of the remote device operating system are not robust or highly available and the device is prone to crashes and hangs. To list just one example, there is no known robust method to get software onto the remote device. This situation is complicated by the fact that there are dozens of different remote devices so that knowing what kind of device it is, whether or not there is a need to push binaries to the remote device, which binaries are required and so on, is a non-trivial task.

It would be helpful if there were a way to provide more robust operating system features on a remote device despite the software storage limitations of the device. Specifically, it would be helpful if there were a way to enable efficient, robust implementation of software distributed between the desktop and the remote device.

SUMMARY OF THE INVENTION

A system, method and computer-executable medium containing computer-executable instructions to provide a framework for providing more robust features on remote devices via remote procedure calls. When a remote device is purchased and brought home, it is desirable for the remote device to "just work", without the need for the user to do anything or have any considerable technical knowledge. In accordance with the invention, in some embodiments the desktop machine discovers the remote device and determines whether or not binaries (executable software) need to be pushed to the remote device. If binaries need to be pushed to the remote device, the desktop determines which particular binaries need to be pushed to the remote device, and pushes the needed binaries to the remote device. Once all needed binaries are loaded onto the remote device, functions on the remote device can be executed via remote procedure calls. The framework described herein may be used for debugging, for developer and user utilities, to remotely execute a task on the remote device from the desktop, to automate tasks on the remote device from the desktop and numerous other tasks.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

When a remote device is purchased and brought home, it is desirable for the remote device to "just work", without the need for the user to do anything or have any considerable technical knowledge. In accordance with some embodiments of the invention, a desktop machine discovers the remote device and determines whether or not binaries (executable software) need to be pushed to the remote device. If binaries need to be pushed to the remote device, the desktop determines which particular binaries need to be pushed to the remote device, and pushes the needed binaries to the remote device. Once all needed binaries are loaded onto the remote device, functions on the remote device can be executed via remote procedure calls.

The framework described herein may be used for debugging, for developer and user utilities, to remotely execute a task on the remote device from the desktop, to automate tasks on the remote device from the desktop and numerous other tasks. The remote procedure call architecture is useful for debugging because the mechanics of message passing is abstracted away by using function calls instead of a stream-based semantic. The remote procedure call architecture is also useful for the development of remote tools because of the level of abstraction offered. For example a device side memory tracker may reside in a library. To discover device memory use, the memory tracer function may be called from the desktop using the remote procedure call architecture. This approach may be less onerous than writing code to directly integrate with connectivity transports such as TCP/IP, etc.

Exemplary Computing Environment

Figure 1:
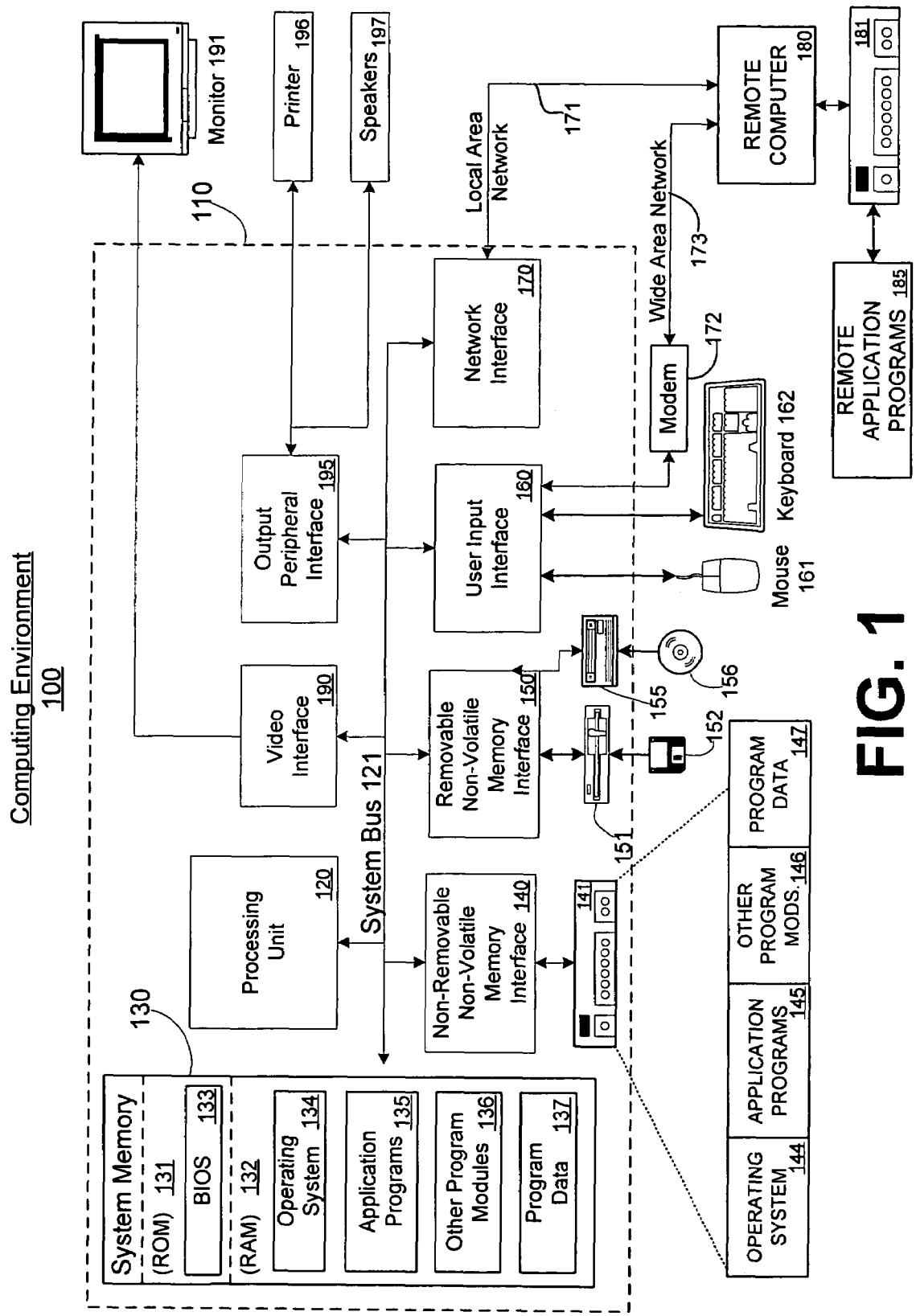
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 2:
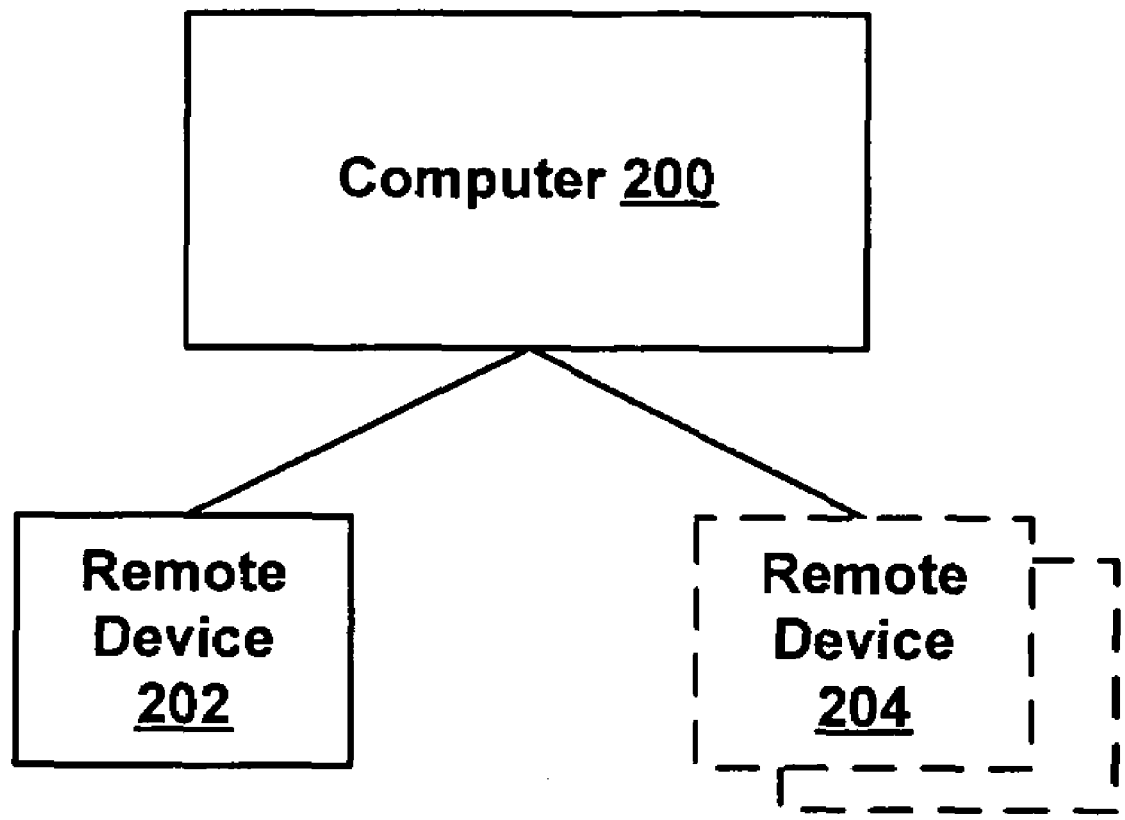
FIG. 2 illustrates a high level example of a distributed computing environment in which the invention may be implemented.

System and Method for Implementing Software Distributed Between a Desktop and a Remote Device FIG. 2 illustrates a high level example of a desktop computer 200 to which one or more remote devices, 202, 204, etc. are connected. Computer 200 may be any suitable computer such as computer 110 described above with respect to FIG. 1. Remote devices, 202, 204, etc. may include any device that provides computing, and information storage and retrieval capabilities, including telephone/fax, Internet and networking features and the like. Commonly known remote devices include personal digital assistants (PDAs), "smart" cellular telephones, digital television set-top boxes, automotive computing devices, routers, modems, and OEM boards manufactured with a remote device operating system for use in embedded systems and the like.

Figure 3:
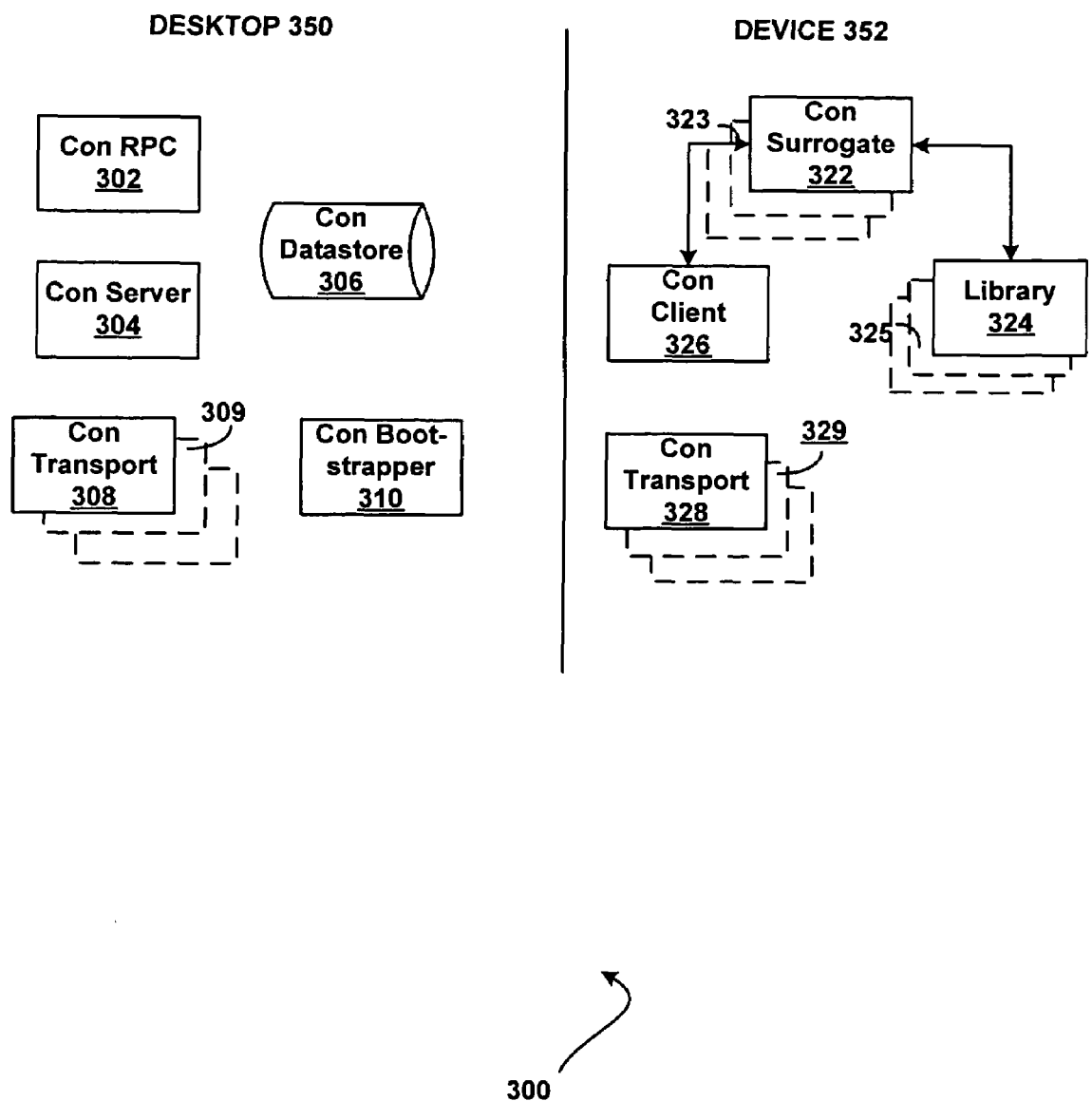
FIG. 3 is a block diagram of a system for implementing distributed software on a remote device from a desktop device in accordance with one embodiment of the invention.

FIG. 3 is a block diagram of a system 300 for implementing software distributed between a desktop and a remote device in accordance with one embodiment of the invention. The described system implements an abstraction layer between desktop and remote device that provides deployment, versioning, run-time activation, proxy-stub interaction during steady state and shutdown of device-side binaries.

Remote Device 352 may include one or more of the following: one or more connectivity surrogates 322, 323, etc. one or more libraries 324, 325, etc., connectivity client 326 and one or more connectivity transports 328, 329, etc.

Connectivity surrogates such as connectivity surrogate 322 in some embodiments of the invention receives arguments from desktop device 350 (e.g., from connectivity remote procedure call processor 302) and returns function results to desktop 350 (e.g., to connectivity remote procedure call processor 302). Connectivity surrogate 322 may listen for remote procedure call requests from remote sources (such as from the desktop 350). Connectivity surrogate 322 may receive input arguments, load a function executable (binary) into which the remote party wishes to call (e.g., from the library or DLL 324), call a stub function that serves as a proxy and return output arguments to the caller. In some embodiments of the invention, the input and output arguments are marshaled arguments. Marshalled arguments are arguments that are passed between processes as data structures which are automatically coded and decoded. Multiple instances of connectivity surrogate 322, 323, etc. may run on remote device 352. Each connectivity surrogate 322, 323, etc. is associated with a particular library 324, 325, etc. One or more surrogates 322, 323, etc. may run on remote device 352 at the same time, each surrogate 322, 323, etc. servicing a different library, 324, 325, etc. An endpoint may uniquely identify remote device 352 and the specific surrogate called (e.g., surrogate 322, 323, etc.).

A library such as library 324, 325, etc. includes executables or "dll"s, such as functions that can be called and executed via remote procedure call processor 302. Library 324 may include executables serviced by, for example, connectivity surrogate 322. One or more libraries 324, 325, etc. may reside on remote device 352. A library (e.g., library 324, 325, etc.) may be a user-supplied library. Connectivity transport 328, 329, etc. may comprise or consume one or more of the following transport mechanisms: a proprietary transport mechanism, TCP/IP, ActiveSync®, KITL®, or Emulator. Connectivity transport layer 328, 329, etc. enables establishment of connections over the wire from a desktop machine to a remote device. Multiple connections are possible between a desktop machine and a remote device. Multiple transports allow different kinds of over-the-wire technologies (e.g., TCP/IP, Emulator, KITL®, etc).

Connectivity client 326 in some embodiments of the invention can be queried to determine what binaries are loaded on remote device 352. Connectivity client 326 can also be queried to determine if a particular surrogate and library is there and what the endpoint of the surrogate on the remote device is. Connectivity client 326 may determine whether or not a particular connectivity surrogate (e.g., library 322), and the library (e.g., library 324) that the connectivity surrogate services are on remote device 352

On a desktop device 350 may reside one or more of the following: connectivity remote procedure call processor 302, connectivity data store 306, connectivity server 304, connectivity transport 308, 309, etc. and connectivity bootstrapper 310. Connectivity transport 308, 309, etc. may comprise or consume one or more of the following transport mechanisms: a proprietary transport mechanism, TCP/IP, ActiveSync®, KITL®, or Emulator. In addition to these components, a library of binaries or executables analogous to library 324 may also reside on desktop device 350.

Connectivity remote procedure call processor 302 in some embodiments of the invention enables a desktop 350 to call into remote device 352 to access a function in the remote device library 324. Connectivity remote procedure call processor 302 may pass information about the remote call that the user wants to make. In some embodiments, connectivity remote procedure call processor 302 connects to the remote device 352, marshals arguments in both directions and returns error codes if a problem is detected. Connectivity remote procedure call processor 302 may also automatically deploy binaries from the desktop 350 to the remote device 352, as described more fully below.

Connectivity server 304 in some embodiments determines if connectivity client 326 is on remote device 352. If connectivity server 304 detects that connectivity client is not on remote device 352, connectivity server 304 will use one of the common bootstrappers (including but not limited to ActiveSync®, KITL®, Emulator or TCP/IP-style transports) to copy the appropriate connectivity client 326 to remote device 352. In some embodiments of the invention, connectivity server 302 queries data store 306 to determine which processor build and platform of connectivity client 326 to copy to remote device 352. Connectivity server 304 may then launch connectivity client 326. Connectivity server 304 may attempt to make a connection to connectivity client 326 and may select which transport to use (e.g., TCP/IP, KITL®, Emulator, ActiveSync®, etc.).

Connectivity data store 306 in some embodiments of the invention, tracks properties or characteristics of a remote device. Tracked information includes platform information and central processing unit (CPU) specific information concerning the binaries required by the remote device 352. The data store 306 in some embodiments is also important for versioning. For example, suppose a product is shipped supporting one CPU but subsequently, support for a second CPU is added. The update may be added to the data store so that the data store may incorporate the support needed for the second CPU. The bootstrapper 310 inquires the remote device 352 for platform-specific, version-specific and CPU-specific information. The bootstrapper 310 may then relay this information to connectivity server 304, which in turn may obtain the correct set of binaries from connectivity datastore 306 based on the platform-specific, version-specific and CPU-specific information obtained. The connectivity server 304 may push down or "bootstrap" the binaries via connectivity bootstrapper 310.

In some embodiments of the invention, the data store 306 is based on XML technology and may comprise a number of XML files. In this case an update may be added to the data store 306 via an XSL add-on. When additions or deletions are made to the data store 306 the data store 306 is reconstructed via XSL transformations (text substitutions), that is, placeholder information in the XSL file is replaced at runtime with actual values. Data store 306 may also track where user-supplied libraries (libraries analogous to library 324 on the remote device) are stored on the desktop device 350.

Connectivity transport layer 308, 309, etc. enables establishment of connections over the wire from a desktop machine to a remote device. Multiple connections are possible between a desktop machine and a remote device. Multiple transports allow different kinds of over-the-wire technologies (e.g., TCP/IP, Emulator, KITL®, etc).

Connectivity bootstrapper 310 in some embodiments of the invention, places binaries on remote device 352. Connectivity bootstrapper 310 may consume external entities such as ActiveSync®, Emulator, TCP/IP or KITL® transports. Bootstrapper 310 may copy or push binaries needed for communication via remote procedure call: connectivity client 326, the connectivity surrogate 322, connectivity transport 328, 329, etc. and the associated library 324, to the remote device 352. Initially, ActiveSync® may be used as a bootstrapper to copy connectivity client 326 onto the remote device 352. Once connectivity client 326 is running on the remote device 352, connectivity client 326 and connectivity server 304 may be used to copy connectivity surrogate 322, 323, etc. and library 324, 325, etc. to the remote device 352 during activation phase.

ActiveSync® is synchronization software that enables information on the remote device 352 to be synchronized with information on a desktop computer. ActiveSync® automatically detects selected port speed of the remote device and updates the serial port of the desktop to match. Further, ActiveSync® automatically detects and configures the port that is used to connect a device to a desktop, whether a serial port, a USB port or an infrared port is chosen. In addition to serial, USB and infrared connections, ActiveSync® supports Ethernet and dial-up connections and supports both wired and wireless implementations of those standards.

Figure 4:
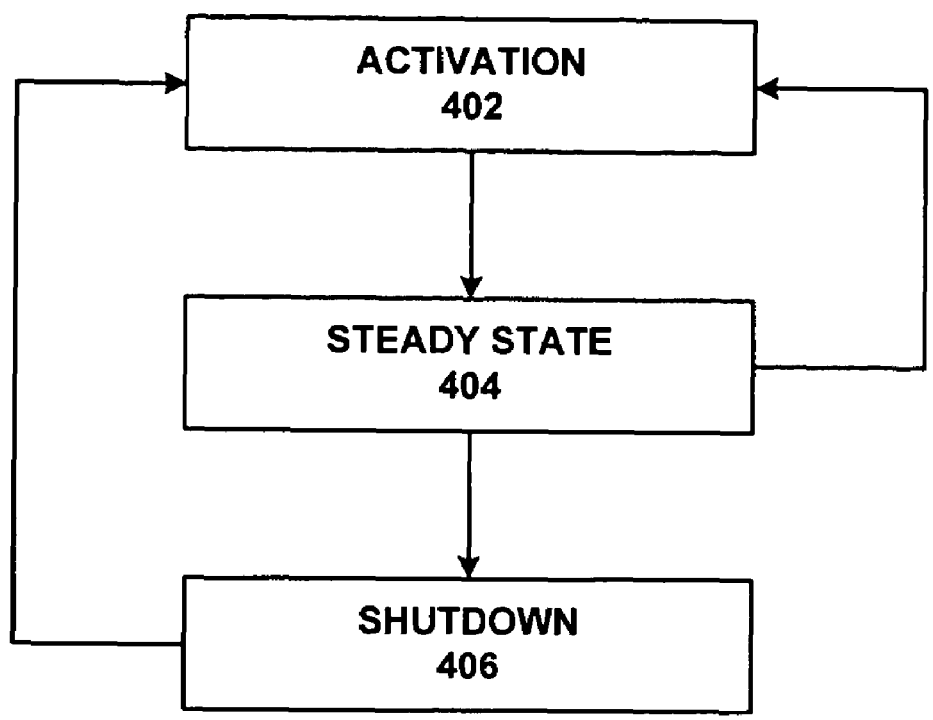
FIG. 4 is an illustration of a life cycle of a system for implementing distributed software on a remote device from a desktop device in accordance with one embodiment of the invention.

FIG. 4 is a block diagram of the RPC life time in accordance with one embodiment of the invention. The RPC life time may include one or more of three temporally sequential phases: Activation, Steady State, and Shutdown.

Activation (step 402) comprises ensuring that the appropriate binaries are loaded onto the remote device and launching a surrogate to execute a binary. Activation includes inspecting the remote device to determine if one or more binaries need to be pushed to the remote device. Because the remote device may run on different types of processors and on different platforms, during the activation phase, the appropriate binary for the device and platform is determined. Furthermore, the remote device may run a version of RPC-related components that are incompatible with those of the desktop machine. In this case, the currently-running RPC components on the device-side may be gracefully shut down and the compatible version of RPC components may be bootstrapped. Activation is described more fully below with respect to FIGS. 5 and 6.

Once all the appropriate binaries are loaded onto the remote device and are running, steady state phase (step 404) is reached and a connection may be made. If a connection is made, a remote procedure call may be made from the desktop to the remote device and (possibly) from the remote device to the desktop. The steady state process in some embodiments of the invention involves converting a series of independent remote procedure calls made on the desktop-side into streams of data marshalling across the wire onto the device-side. The device-side process (for example, a particular instance of a connectivity surrogate executable which is running) may receive the data stream and convert it back into a series of remote procedure calls. The remote procedure calls may be made independently on the desktop-side, and may be executed on the device-side.

During steady state, in some embodiments of the invention, if the incoming data-stream from the wire is faster than the ability to process it on the device-side, the incoming data stream rate is slowed down dynamically to match the ability of the device-side (typically due to limitations of CPU power and memory constraints) to process the data.

In some embodiments of the invention, both the desktop-side and device-side can recover from crashes such as user code access violations. Recoverability as used with respect to this feature means that one remote procedure call that crashes does not fundamentally affect another later remote procedure call that does not crash. In some embodiments of the invention, the mechanism to accomplish recovery is as follows:

A reader thread inside the remote device connectivity surrogate module converts a data stream into a list of pending remote procedure calls to be executed. Each pending remote procedure call has thread-affinity associated with it and only a particular thread can execute a particular remote procedure call. The thread-affinity mechanism catches any access-violation via structural exception handling. If an exception is thrown, the remote procedure call connectivity catches the exception and notifies the desktop-side that an access-violation has occurred. If an exception is not thrown after the remote procedure call process on the thread, then the desktop-side may be notified that the remote procedure call has been successfully processed by marshalling the return results of the remote procedure call to the wire back to the desktop-side.

In some embodiments of the invention, the remote procedure call connectivity may recover from a user code hang. The remote procedure on the device-side may include a watch-dog facility to monitor all remote procedure calls currently executing inside the connectivity surrogate. If a thread-affined remote procedure call fails to report a transaction for an excessively long time (the definition of "an excessively long time" is specified), the watch-dog deems it a hang and reports back to the desktop-side to allow the desktop-side to kill the hung remote procedure call.

Step 406 represents the shutdown phase of the remote procedure call life cycle. The shutdown phase may result from one of three types of requests for shutting down the remote procedure device-side binaries. One type of request may occur when the desktop-side finishes all remote procedure calls to be executed on the device-side. A second type of request may occur when the underlying connectivity components shut down. A third possible scenario for shutdown occurs when the desktop machine detects an incompatible (e.g., earlier) version of remote procedure call components already running on the remote device.

When the desktop-side has completed making the desired remote procedure calls, it so informs the device-side. In some embodiments of the invention, a device-side binary maintains a list of desktop clients and releases and gracefully shuts itself down when the list of desktop clients contains no entries. The remote procedure call device-side binary may have the choice of keeping itself alive even when it has no current desktop client. The option of whether a remote procedure call device-side binary can stay alive independent of the desktop is configurable via a parameter provided in the Activation phase.

When the underlying connectivity components need to shut down, in some embodiments of the invention, the remote procedure call device-side binaries are shutdown as well.

Figure 5:
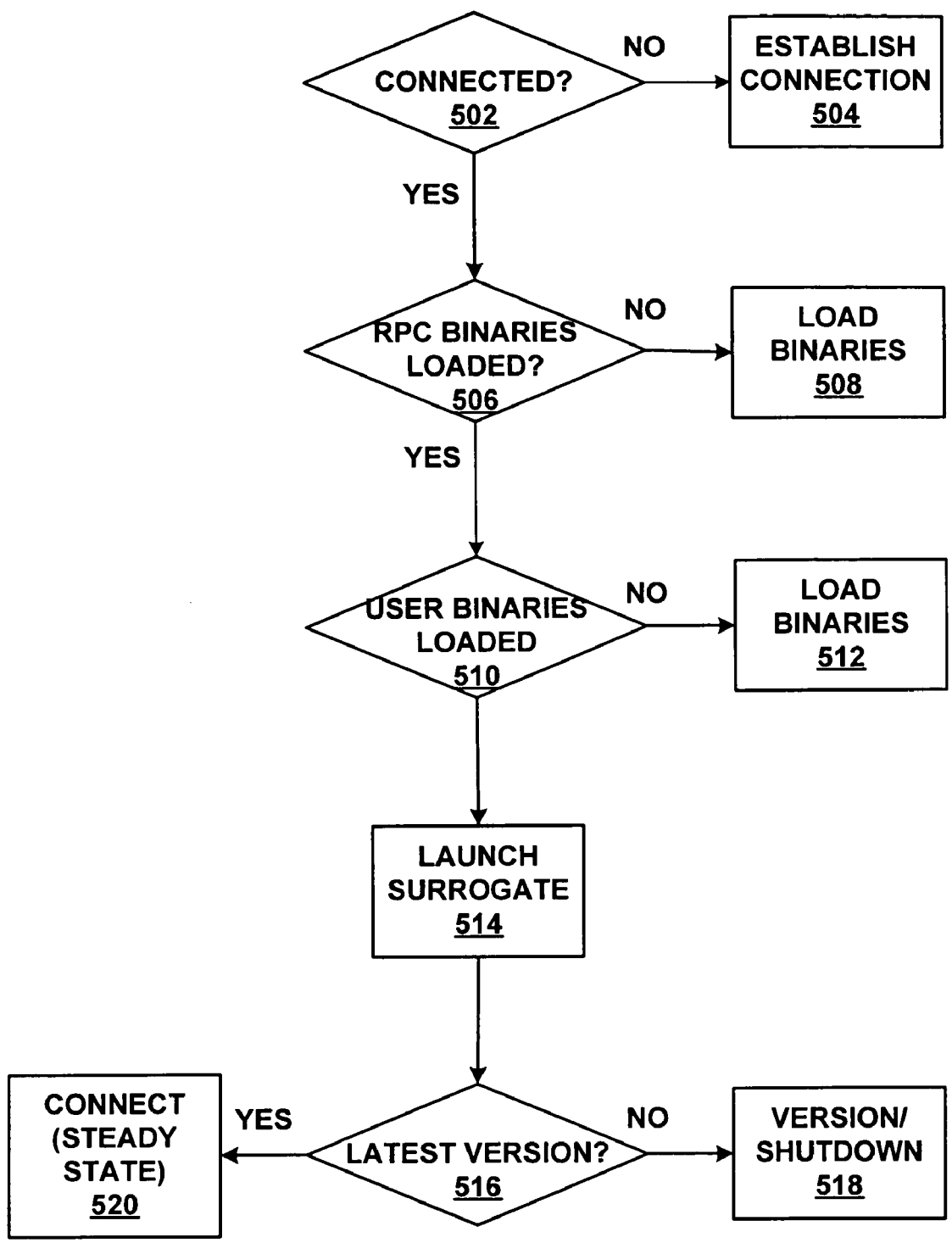
FIG. 5 is a flow diagram of a method for implementing distributed software on a remote device from a desktop device in accordance with one embodiment of the invention.

Referring now to FIG. 5, an exemplary method 500 for implementing software distributed between a desktop and a remote device is illustrated. At step 502, in some embodiments of the invention, it is determined whether there is a cached in-process connection to the device-side process hosting the user device-side binary. If there is not, a connection to the device-side remote procedure call process may be established (step 504) by the remote procedure call process on the desktop-side in some embodiments of the invention. Establishment of a connection may be parameterized by the device's end-point description and the type of transport used between the desktop-side process and the device-side process. In some embodiments of the invention, the connection process is taken care of by lower layer connectivity components, as described above.

If a connection is established, steady state has been reached.

At step 506 it is determined whether or not the remote procedure call device-side binaries are already bootstrapped or loaded onto the device. If it is determined that the remote procedure call device-side binaries are not already loaded, the remote procedure call device-side binaries are load at step 508. The loading of remote procedure call binaries is described more fully with respect to FIG. 6.

At step 510 in some embodiments, it is determined whether or not the user device-side binary intended to be executed on the device-side when called from the desktop-side is bootstrapped or loaded. The remote procedure call process on the desktop-side may first inquire whether such a binary exists on the device-side.

At step 512, if the user device-side binary is not loaded on the device, in some embodiments of the invention, the remote procedure call process on the desktop-side consumes the data store to pick the correct platformed, CPU-specific user device-side binary to be pushed down the wire onto the remote device.

The connectivity surrogate process may then be launched (step 514) to host the user device-side binary to activate the processing of any remote procedure calls to the user device-side binary.

If the remote procedure call process on the desktop-side detects that the connectivity surrogate for the user device-side binary is running and is hosting the user device-side binary, then it will handshake or connect with it to inquire about its version. At step 516, it is determined whether or not the remote call procedure process device-side binary is running the correct version. If the version of the device-side binaries is deemed incompatible with the one running on the desktop-side, then a versioning-and-shutdown process automatically is triggered step 518 in some embodiments.

The versioning-and-shutdown process involves notifying the device-side binaries (the particular instance of the connectivity surrogate associated with the user device-side binary) that it must shutdown gracefully and deterministically and initiating the activation process described herein. If the correct version is running, at step 520, the connection is established.

Figure 6:
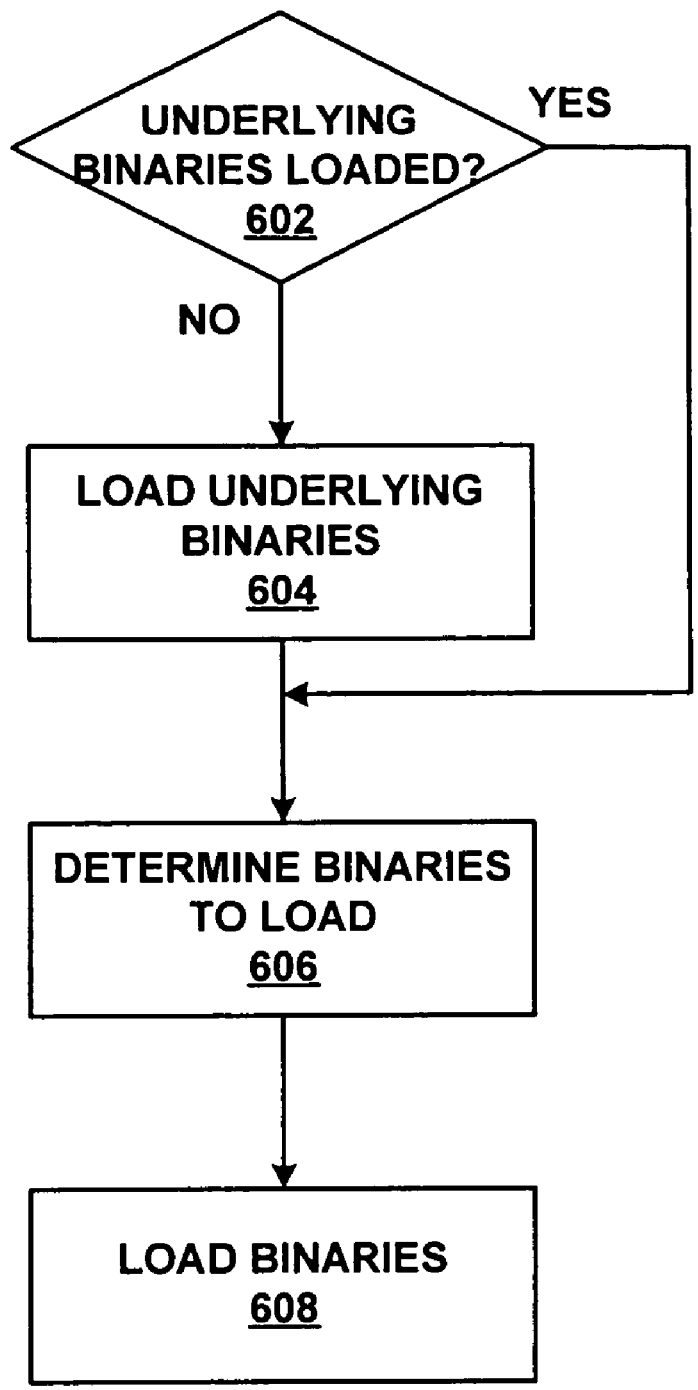
FIG. 6 is a flow diagram of a method for activating software on a remote device from a desktop device in accordance with one embodiment of the invention.

FIG. 6 illustrates an exemplary method for activation in accordance with one embodiment of the invention. In the course of establishing the very first connection between the desktop-side process and the device-side process, it may be discovered that the remote procedure call process device-side binaries have not been bootstrapped. (This is often the case when a brand new remote device is used with the desktop computer for the very first time.)

A deterministic bootstrapping process for remote procedure call process device-side binaries involves the following:

1. If the underlying connectivity components are not already bootstrapped (602), a deterministic bootstrapping process for the remote procedure call process's underlying connectivity components loads the binaries (604)

2. Once the underlying connectivity components are successfully bootstrapped, the remote procedure call process on the desktop-side uses it to bootstrap remote procedure call process device-side binaries.

The remote procedure call process on the desktop-side consumes the data store which contains repository of all remote procedure call process device-side binaries for each supported platform, for each supported CPU to determine which binaries to load (606). The proper choice of remote procedure call process device-side binaries depends upon the following parameters:

a. the platform of the remote device (for example, Windows® CE® 4.2).

b. the central processing unit of the device (for example, Armv4).

3. The remote procedure call process device-side binaries (the connectivity surrogate binary and its dependents) are loaded (608).

Figure 7:
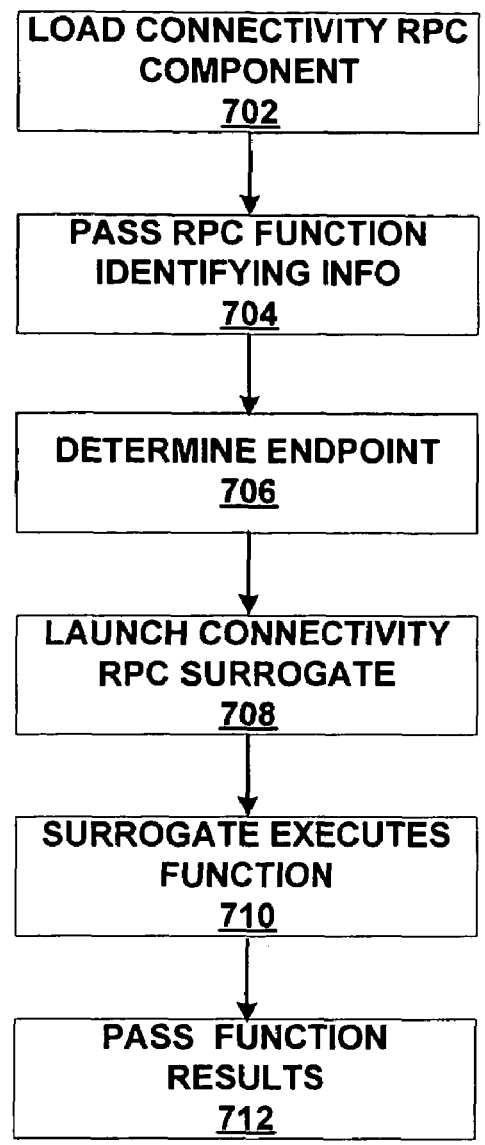
FIG. 7 is a flow diagram of a method for making a remote procedure call in accordance with one embodiment of the invention.

FIG. 7 illustrates an exemplary method for making a remote procedure call in accordance with one embodiment of the invention. In some embodiments of the invention, to make a call from a desktop machine to a remote device, at 702 the connectivity remote procedure call component on the desktop is loaded. The remote procedure call function may be passed input arguments. In some embodiments of the invention, the input arguments are flattened. The remote procedure call function may be passed any combination of the following information: the name of the function to call on the remote device, the name of the library that contains the function on the remote device, the location of the library on the desktop holding the function on the desktop in case the desktop library function must be copied to the remote device (e.g., if for example, the binary on the remote device is a previous or incompatible version of the binary on the desktop), a globally unique identifier which uniquely identifies the remote device that the desktop is calling.

At step 706 endpoint information about the remote device is determined. In some embodiments, the globally unique identifier may be used to determine endpoint information by querying the data store.

At step 708 a remote procedure server thread on the remote device (part of connectivity component of the remote device) is contacted and the presence of a remote procedure call component (surrogate) on the remote device is determined. If there is no surrogate running, one is launched. If necessary, surrogate, library and connectivity component (for remote device) are copied over to the device if necessary.

At step 710 the surrogate may receive the input arguments and pass them into the stub function in the library. The stub function may call into the desired function (the function that the desktop wants to call). The stub function may receive one or more return arguments, flatten them into a byte array and pass them back to remote procedure call component (device-side) client.

At step 712 the function results (return arguments) or an error code if something went wrong are sent back to the caller.

On the desktop the return arguments are received.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the embodiments of the various figures, it is to be understood that other similar embodiments may be used or modifications and additions may be made to the described embodiments for performing the same function of the present invention without deviating therefrom. Similarly it will be understood that although the framework is described within the context of an automated way of implementing software, the invention is not so limited and may be used wherever useful. Therefore, the present invention should not be limited to any single embodiment, but rather should be construed in breadth and scope in accordance with the appended claims.

What is claimed is:

1. A deterministic method employed by a local computing device for bootstrapping software onto a remote computing device communicatively coupled to the local computing device, the method comprising:
   determining, by the local device, that a connectivity component is missing from the remote computing device;
   loading, by the local computing device, the connectivity component onto the remote computing device via an existing transport mechanism;
   directing, by the local computing device, the loaded connectivity component on the remote computing device to bootstrap a remote procedure call component onto the remote computing device;
   issuing by the local computing device to the bootstrapped remote procedure call component at least one argument via a remote procedure call to the remote procedure call component;
   executing, by the remote procedure call component in response to the remote procedure call, a binary stored in a library on the remote computing device, the executed binary loading the software onto the remote computing device.

2. The method of claim 1, further comprising determining the connectivity component to load by querying a data store of connectivity components.

3. The method of claim 2, wherein the data store of connectivity components resides on a second computing device.

4. The method of claim 1, wherein the connectivity component to be loaded onto the remote computing device is determined by a type of central processing unit of the remote computing device.

5. The method of claim 1, wherein the connectivity component to be loaded is determined by a type of platform running on the remote computing device.

6. The method of claim 1, wherein the remote procedure call component receives a result of executing the binary stored in the library on the remote computing device to a second computing device.

7. The method of claim 1, wherein the remote computing device is a personal digital assistant.

8. The method of claim 1, wherein the remote computing device is a router.

9. The method of claim 8, wherein a process running the first version of the binary is terminated.

10. The method of claim 1, wherein the remote computing device is a modem.

11. The method of claim 1, wherein the remote computing device is an OEM board.

12. The method of claim 1, wherein the remote computing device is a smart telephone.

13. The method of claim 1, wherein the binary to be executed in the library is a first version of the binary and a second version of the binary is loaded into the remote computing device library.

14. A deterministic method employed by a local computing device for bootstrapping software onto a remote computing device communicatively coupled to the local computing device, the method comprising:
   determining, by the local device, that a connectivity component is present on the remote computing device;
   directing, by the local computing device, the present connectivity component on the remote computing device to bootstrap a remote procedure call component onto the remote computing device;
   issuing by the local computing device to the bootstrapped remote procedure call component at least one argument via a remote procedure call to the remote procedure call component;
   executing, by the remote procedure call component in response to the remote procedure call, a binary stored in a library on the remote computing device, the executed binary loading the software onto the remote computing device.

15. The method of claim 14, further comprising determining the connectivity component to load by querying a data store of connectivity components.

16. The method of claim 15, wherein the remote computing device is a first computing device and the data store of connectivity components to be loaded resides on a second computing device.

17. The method of claim 14, wherein the connectivity component to be loaded onto the remote computing device is determined by a type of central processing unit of the remote computing device.

18. The method of claim 14, wherein the connectivity component to be loaded is determined by a type of platform running on the remote computing device.

19. The method of claim 14, further comprising receiving a result of executing the binary.

20. The method of claim 14, wherein the remote computing device is a personal digital assistant, a router, a modem, an OEM board or a smart telephone.

21. The method of claim 14, wherein the binary to be executed in the library is a first version of the binary and a second version of the binary is loaded into the remote computing device library.

22. The method of claim 21, wherein a process running the first version of the binary is terminated.

23. A method employed by a local computing device for using a remote procedure call component on a remote computing device communicatively coupled to the local computing device to enable the local computing device to execute a function on the remote computing device, the method comprising:
   determining, by the local computing device, an endpoint associated with the remote procedure call component on the remote computing device, the remote procedure call component also being associated with a library, the library comprising a plurality of callable binaries;
   determining, by the local computing device, that the remote procedure call component is running on the remote computing device;
   identifying, by the local computing device to the running remote procedure call component, the function to execute and the library the function is stored in via a remote procedure call to the remote computing device;
   executing, by the remote procedure call component at the remote computing device, the function at the remote computing device; and
   receiving, by the local computing device from the remote procedure call component, a result of executing the function.

* * * * *